United States Patent [19]

Johnson

[11] 4,148,574
[45] Apr. 10, 1979

[54] SONAR CONTROLLED TWO FOCAL POSITION LENS SYSTEM

[75] Inventor: Bruce K. Johnson, Andover, Mass.

[73] Assignee: Polaroid Corporation, Cambridge, Mass.

[21] Appl. No.: 839,839

[22] Filed: Oct. 6, 1977

[51] Int. Cl.² .............................................. G03B 3/00
[52] U.S. Cl. ...................................... 354/195; 354/25
[58] Field of Search ................................ 354/25, 195

[56] References Cited

U.S. PATENT DOCUMENTS

| Re. 27,461 | 8/1972 | Harvey | 354/25 |
| 3,185,059 | 5/1965 | Durst | 354/25 |
| 3,443,502 | 5/1969 | Harvey | 354/25 |
| 3,479,943 | 11/1969 | Goshima | 354/25 |
| 3,618,499 | 11/1971 | Harvey | 354/25 |
| 3,736,057 | 5/1973 | Harvey | 354/25 |
| 4,065,778 | 12/1977 | Harvey | 354/25 |

Primary Examiner—Russell E. Adams
Attorney, Agent, or Firm—Edward S. Roman

[57] ABSTRACT

A photographic camera in which a two-position lens is focused automatically on subjects located within "near" and "far" distance ranges from the camera. The lens is normally positioned in one of the two positions and movable to the other of the two positions in response to a signal generated by an electronic ranging circuit upon the detection of subject location in the focus range to which the other position corresponds.

15 Claims, 2 Drawing Figures

SONAR CONTROLLED TWO FOCAL POSITION LENS SYSTEM

BACKGROUND OF THE INVENTION

This invention relates to photographic apparatus and more particularly, it concerns automatic lens focusing systems for cameras.

Systems by which the objective lens of a camera may be focused on a subject automatically are disclosed in such prior publications as U.S. Pats. No. 3,522,764, No. 3,713,371, West German Pat. No. 864,048 and I.B.M. Technical Disclosure Bulletin, Volume 9, No. 7, December, 1966 pp. 744–745. With the exception of U.S. Pat. No. 3,713,371, the systems disclosed in these prior publications involve the transmission of ultrasonic energy toward a subject to be photographed and the reflection of such energy from the subject back to the camera. Characteristics including the time duration between energy transmission and reception are electronically processed to develop a control signal representative of the distance between the camera and the subject. The control signal is then used to operate a lens mount drive provided in the camera so that the lens will be positioned to focus the subject on the film plane of the camera. In the excepted U.S. Pat. No. 3,713,371, the distance between the camera and the subject is detected by a photoelectrically powered spacial frequency sensing device capable of generating a signal in response to the sharpness of an image formed by the camera lens when properly focused. The system is limited to use in relatively complex reflex type cameras in which the characteristics of focused image forming light passing through the lens is relied on to develop a signal indicative of camera subject range.

In a commonly assigned copending U.S. Application for patent Ser. No. 729,392, filed Oct. 4, 1976 by Juerg Muggli, there is disclosed an ultrasonic ranging system for a camera having a lens mount movable to a position at which a subject to be photographed is in focus. This system includes an ultrasonic transducer that responds to a keying pulse by transmitting a relatively short burst of frequency modulated ultrasonic energy, and a synchronized receiver for processing an echo signal produced by the transducer on receipt of an echo within a predetermined time interval following the transmission time of the burst. The receiver produces a range signal with a characteristic linearly related to the distance of a subject from a camera. Echo signals produced by the transducer are filtered by a variable filter operative in a manner to avoid the need for separate transmitting and receiving transducers. The receiver of the system includes a detector means responsive to the output of the filter for producing a range signal when the output exceeds a predetermined level. The timing of the range signal measured from the time of the keying pulse is representative of camera-subject distance.

The range finding systems of the prior art coupled with the current state of the electronics art, particularly as represented by the disclosure of the aforementioned copending U.S. application, make possible the mass production of relatively low cost cameras having automatic range finding systems. There is a need, however, for a combination of simplicity and reliability in a drive system capable of responding to the range indicating signal and adjustably positioning the camera objective lens to focus the subject properly on the film plane of the camera in a time interval commensurate with the time required to depress a camera shutter actuating button.

SUMMARY OF THE PRESENT INVENTION

In accordance with the present invention, the desirable operating characteristics and physical simplicity of the ultrasonic ranging system disclosed in the aforementioned copending application is incorporated in a camera having a two position objective lens capable of focusing subjects within two ranges of distance from the camera properly on the camera film plane. The lens may be biased normally to one position corresponding, for example, to a "far" range and retained in that position if the time duration between sound burst transmission and range signal detection differs (e.g., is longer) from that corresponding to the boundary distance separating two distance ranges. If the time duration of range signal detection corresponds to a distance on the other side of the range separating boundary, the lens is moved to the other of the two positions.

Because the time duration of ultrasonic energy transmission to and from a subject within a "near" range, which requires lens focusing adjustment, is likely to be less than 20 milliseconds, the lens is preferably biased normally to a first infinity position corresponding to a far range in which camera subject distance exceeds 3.0 meters, for example. The lens may be retained in that position by linkage controlled by a solenoid energized upon initial depression of the shutter actuating button of the camera. If the detection signal is received within a predetermined time interval, say 20 milliseconds, the solenoid is deenergized so that further depression of the shutter actuator operates the linkage to move the lens to a second or near range position prior to full movement of the actuating button to operate the camera shutter. Upon release of the shutter actuating button, the solenoid is deenergized and the lens returned to its initial position under a biasing force which may be provided by a simple compression spring.

Among the objects of the present invention are therefore: the provision of an improved automatic lens focusing system for photographic cameras; the provision of such a system particularly suited for cameras having a two position lens for dual range focusing; the provision of an automatic lens focusing system which accommodates an easily manufactured and thus inexpensive camera lens and lens mount structure; and the provision of such an automatic lens focusing system which is adaptable to mass produced, inexpensive cameras from the standpoint of both economic and physical adaptation to such cameras.

Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENT

Figure 1:
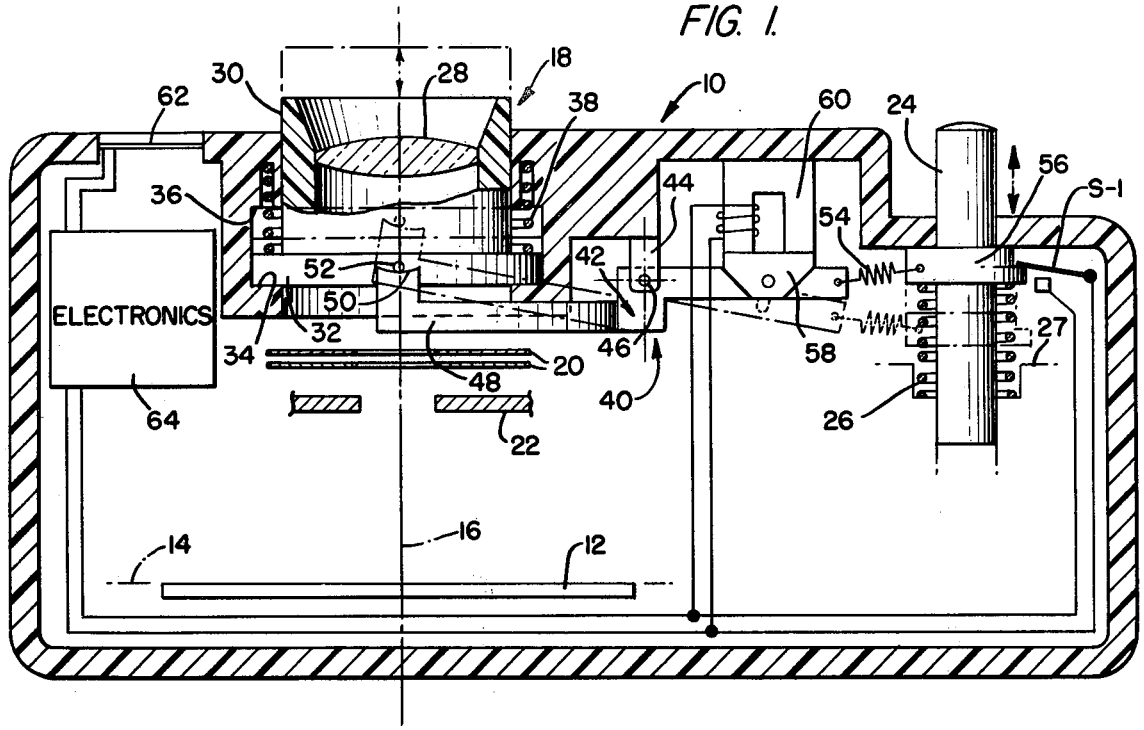
FIG. 1 is a largely schematic cross section of a camera incorporating the lens focusing system of the present invention.

In FIG. 1 of the drawings, an exemplary embodiment of a camera incorporating the automatic lens focusing system of the present invention is shown to include a camera body or housing 10 capable of effecting a light-tight enclosure for photographic film 12 at a pre-established film plane 14. The housing 10 additionally supports on an optical axis 16 an objective lens generally designated by the reference numeral 18 in a manner which will be described in more detail below. Conventional shutter blades 20 and an aperture stop 22 are situated between the lens 18 and the film plane 14 and aligned with the axis 16.

The shutter blades 22 are connected by linkage (not shown) to a shutter actuating button 24 movable from a normal or extended position as shown by solid lines in FIG. 1 against a biasing force represented by a compression spring 26, through an intermediate lens actuating position represented by the phantom line illustration shown, to a fully depressed shutter actuating position established by a stop 27.

It will be appreciated by those skilled in the art that the camera body 10 may include other features well-known in the photographic art such as an automatic light sensitive control system for the shutter blades 20 and/or the aperture stop 22. In addition, the housing might be designed to accommodate either roll film or sheet film and may be equipped with spreader rolls and other structure incident to the exposure of self-processing film. Such features have been omitted from the drawings in the interest of more clearly illustrating the automatic lens focusing system to which the present invention is especially directed.

The objective lens 18 includes at least one movable lens element 28 supported by a cylindrical lens barrel 30 adjustable axially along the optical axis 16. In this instance, the lens element 28 and barrel 30 are movable as a unit between a first position in which an annular flange 32 abuts a rear stop 34 and a second position in which the flange 32 abuts against a forward stop 36. A compression spring 38 tends to bias the lens barrel into the first position in which the flange 32 abuts the rear stop 34. As a result of this construction and mounting organization of the lens 18, a subject to be photographed located within a "far" distance range, for example, in excess of 3 meters from the camera body 10, will be properly focused on the film plane 14 when the flange 32 engages the rear stop 34. Correspondingly, subjects located closer to the camera body 10 than the exemplary 3 meter boundary distance, or within a "near" distance range, will be focused on the film plane 14 when the flange 32 engages the forward stop 36.

Dual focus range lenses similar in function to the lens organization thus described are known in the art and may be embodied in structures different from that illustrated. For example, a system of interchangeable lenses of different focal length may be supported by the camera body 10 for movement laterally from the optical axis 16 to effect a dual range focusing system. An example of this latter lens structure is illustrated in U.S. Pat. No. 3,925,797, issued to Helmut Ettischer on Dec. 9, 1975. Such lens systems rely on depth of focus attainable by a reduced aperture stop and thus achieve the dual range focusing of subject properly on the focal plane 14.

In the disclosed embodiment, movement of the lens 28 and lens barrel 30 between the two positions mentioned is achieved by force exerted manually on the shutter actuating button 24 by virtue of a pivotal lens positioning linkage extending between the lens barrel 30 and the actuator button 24. This linkage is designated generally in FIG. 1 by the reference numeral 40. As shown, the linkage includes a lever arm 42 pivoted centrally from a housing carried bracket 44 on a pivotal axis 46. The arm 42 extends as a semi-circular yoke 48 to the optical axis 16, terminating in forwardly disposed abuttment surfaces 50 engaging pins 52 radiating diametrically from the flange 32 on the lens barrel 30. The opposite end of the lever arm 42 is connected by a tension spring 54 to a flange 56 on the actuator button 24. It will be noted that the orientation of the tension spring 54 is aligned with the arm 42 when the actuator button 24 is in its normal or extended position so that it exerts a pivoting action on the arm 42 toward a position in which the flange 32 abuts the rear stop 34.

Also supported on the arm 42 is a magnetic keeper element 58 in a position to be retained against an electromagnet 60. The attraction force of the magnet 60, the elasticity of the spring 54 as well as the compressibility of the spring 38 are related in such a manner that when the electromagnet 60 is energized, the keeper will be retained in the position shown in FIG. 1 against the tension of the spring 54 when the actuator button 24 is depressed to a position tending to pivot the arm 42 about the axis 46 and move the lens barrel 30 against the forward stop 36.

Control over the electromagnet 60 in a manner to determine whether the lens 18 is retained in its initial first position for focusing subjects in a "far" distance range or whether it will advanced during the depression of the actuator button to its second position in which the flange 32 engages the forward stop 36 for focusing subjects within the "near" range, is effected automatically by an ultrasonic ranging system of the type disclosed in copending U.S. Application Ser. No. 729,392 in conjunction with the logic circuit illustrated in FIG. 2 of the drawings. The ultrasonic ranging system includes a transducer 62 mounted in the forward wall of the camera body and by which a short burst of ultrasonic energy may be transmitted to and received from a subject to be photographed. This system includes electronic circuitry fully described in the aforementioned copending application which is expressly incorporated herein by reference to the extent necessary to provide one skilled in the art to practice the present invention. The ranging system thus represented by the transducer 62 and electronics 64 in FIG. 1 is operated by closure of a switch S1 normally held in an open condition by the shutter actuating button 24 as shown.

Figure 2:
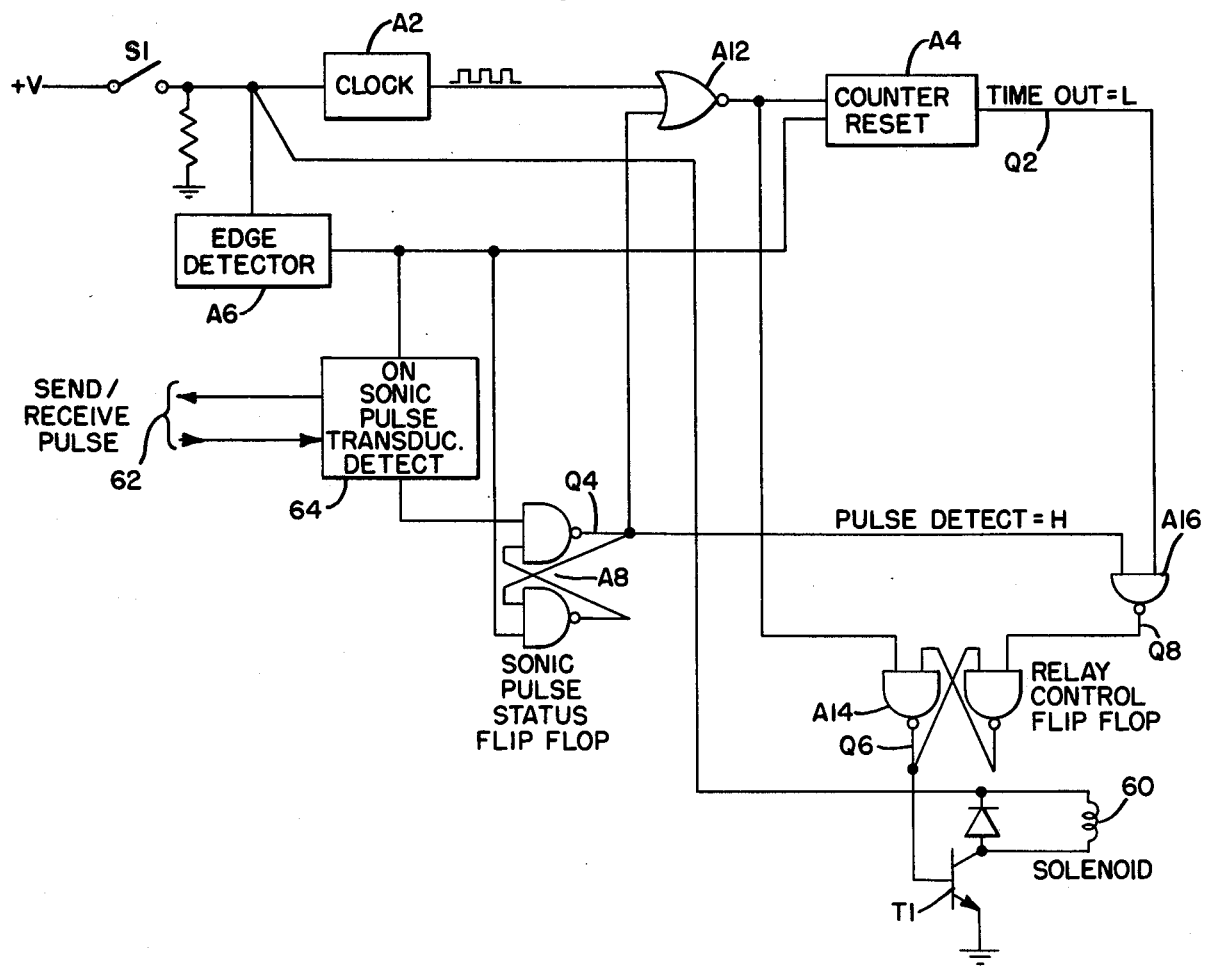
FIG. 2 is a logic circuit diagram used in conjunction with known electronic ranging systems which the focusing system of the camera illustrated in FIG. 1 may be operated.

Operation of the structural organization depicted by FIG. 1 of the drawings will be appreciated from the disclosure of the aforementioned copending patent taken in conjunction with the exemplary logic circuit illustrated in FIG. 2 of the drawings. In particular, when the switch S1 is closed upon initial depression of the shutter actuating button 24, a pulse generator or clock A2 is turned on and an edge detector A6 generates a system start pulse that resets a counter A4 and forces an output Q2 high, resets a sonic pulse status flip-flop A8 to force a low at an output Q4, and activates the ultrasonic transducer 62 to transmit a burst of sonic energy toward a subject to be photographed.

During the ensuing increment of time, the low at the output Q4 is applied to an input of an OR gate A12 to enable the gate A12 and thus allow a continuous stream of clock pulses generated by the clock A2 to be transmitted to the counter A4 and a relay control flipflop A14. The setting of the flip-flop A14 by the clock pulses forces a high signal at an output Q6. The high at Q6 is applied to the base of a transistor T1 to turn on the transistor and energize the electro-magnet 60. The energized electromagnet attracts the keeper 58 on the lens linkage 40 and thereby prevents the link from pivoting under the tension in the spring 54 upon further depression of the button 24.

The counter A4 counts the clock pulses transmitted by the gate A12 and, after a specified "time-out" pulse count has been reached, forces the output Q2 to a low state. When the sonic burst reflected from the subject to be photographed is detected by the transducer 62, a "sonar pulse received" signal is generated to reset the flipflop A8 and force the output Q4 high. The high Q4 output disables the gate A12 and thus stops the transmission of clock pulses to the counter 84 and to the flipflop A14. The high Q4 output also enables a gate A16 and, thus, an output Q8 is determined by the state of the counter of the output Q2. If the counter A4 has reached the predetermined time-out count before the reflected pulse is received by the transducer 62, the output Q2 of the counter will be low and the output Q8 will remain high when Q4 goes high. Thus, the output Q6 of the flip-flop A14 will remain high and the electromagnet 60 will remain energized to hold the lens against movement from its first position under the bias of the tension spring 54 upon movement of the button 54 to its fully depressed position for actuation of the shutter blades 20.

If the counter A4 has not reached the predetermined time-out count before the reflected pulse is received, however, the output Q2 of the counter will be high and the output Q8 will be forced low while Q4 is high. The low at Q8 will force the Q6 output of the flip-flop A14 low to turn off the transistor T1 and deenergize the electromagnet 60. In this case, the lens link 40 will be pivoted by depression of the shutter actuating button 24 and the spring 54 to move the lens 18 forwardly to its second position to which the flange 32 engages the forward stop 36 prior to full movement of the button 24 for actuation of the shutter blades 22. Thus, a subject within the "near" distance range will be properly focused on the film plane 14.

In this manner, there are provided means which respond to the output signal of the flip-flop 14 to locate the lens 28 in the appropriate one of its first and second positions to focus the subject to be photographed on the film plane.

On release of the shutter button 24, the lens linkage 40 will either remain in or be pivoted back to its initial position as a result of the return bias of the spring 38. Also, the electromagnet will be deenergized and the ranging system turned off as a result of the reopening of the switch S1.

It will be appreciated, therefore, that by a simple determination of the time required for the ultrasonic burst to be transmitted from and reflected back to the transducer 42, the position of a subject to be photographed either beyond or in front of a boundary distance separating "far" and "near" focus ranges may be used to properly position the two position lens 18. It is contemplated that other specific structural organizations such as rotatable electric motors, electromagnetically cocked spring motors and the like may be used to achieve movement of the lens 18 between the two positions described. Also, and as above indicated, the specific mechanism by which the lens is moved may vary depending on the particular structural organization of the lens 18 and the mount therefor provided by the housing 10.

Thus, it will be appreciated that as a result of the present invention an extremely effective automatic focusing system for two position camera lenses is provided and by which the above-mentioned objectives are completely fulfilled. Since many variations in the described embodiment are possible and will be apparent to those skilled in the art, it is expressly intended that the foregoing description is illustrative only, not limiting, and that the true spirit and scope of the present invention be determined by reference to the appended claims.

What is claimed is:

1. A photographic camera having a film plane comprising:
   a lens;
   means for mounting said lens for displacement between a first position in which subjects located in one distance range from the camera are focused on the film plane, and a second position in which subjects located in another distance range from the camera are focused on the film plane;
   an actuator;
   sonic pulse transmitting and receiving means responsive to the manual actuation of said actuator for detecting the location of a subject to be photographed within one or the other of such distance ranges and for generating a signal corresponding to either one or the other of such two ranges when the time interval between pulse transmission and reception corresponds to that distance range in which the subject is located; and
   means responsive to said signal for displacing said lens mounting means to position said lens in the appropriate one of its said first and second positions to focus the subject on the film plane.

2. The apparatus recited in claim 1 wherein said last-mentioned means includes an electromagnet operatively associated with said lens moving means, and circuit means responsive to said signal for controlling said electromagnet to facilitate the location of the lens in one or the other of said first and second positions.

3. The apparatus recited in claim 1 wherein said last-mentioned means includes a yieldable linkage interconnecting said lens mounting means and said actuator, means for normally positioning said lens in its said first position, and an electromagnet operable to retain said linkage to hold said lens in its said first position upon manual movement of said actuator or to release said linkage for movement with said actuator to position said lens in its said second position dependent upon whether the detected location of the subject corresponds to said one or said other distance range.

4. The apparatus of claim 3 wherein said yieldable linkage includes a lever arm disposed for pivotal movement with respect to the camera with one end thereof engaged to said lens mounting means, and a resilient spring element having one end thereof connected to said actuator with the other end thereof connected to the other end of said lever arm so as to yieldably bias said lever arm to move in correspondence with movement of said actuator.

5. The apparatus recited in claim 1 wherein the one distance range is a "far" range, the other distance range is a "near" range, the lens is normally biased to the first position and wherein said means for detecting the location of a subject generates a signal only upon the location of a subject in said "near" range.

6. In a photographic camera having a film plane comprising:
   a lens;
   means for mounting said lens for displacement between a first position in which subjects located in a far distance range from the camera are focused on the film plane, and a second position in which subjects located in a near distance range from the camera are focused on the film plane;
   an actuator;
   means responsive to the manual actuation of said actuator for detecting the location of a subject to be photographed within the near distance range and for generating a signal denoting the detection of such a subject in the near range;
   means responsive to said signal for displacing said lens mounting means to move said lens to said second position from said first position; and
   means also responsive to the manual actuation of said actuator for exposing the film plane to light passing from the subject while said lens is in its said second position, said lens displacing means thereafter operating to automatically displace said lens mounting means to return said lens to its said first position after exposure.

7. The apparatus recited in claim 6 wherein said means for displacing said lens mounting means includes a yieldable linkage interconnecting said lens mounting means and said actuator.

8. The apparatus of claim 7 wherein said yieldable linkage includes a lever arm disposed for pivotal movement with respect to the camera with one end thereof engaged to said lens mounting means, and a resilient spring element having one end thereof connected to said actuator with the other end thereof connected to the other end of said lever arm so as to yieldably bias said lever arm to move in correspondence with movement of said actuator upon the actuation thereof.

9. The apparatus recited in claim 7 including an electromagnet operable when energized to retain said linkage against movement with said actuator upon manual actuation thereof and thereby prevent movement of said lens from its said first position when subjects are located in the far distance range.

10. The apparatus recited in claim 9 wherein said signal responsive means is operative to deenergize said electromagnet to facilitate movement of said lens to its said second position when subjects are located in the near distance range.

11. The apparatus recited in claim 7 wherein said lens mounting means supports said lens for axial movement between its said first and second positions.

12. The apparatus recited in claim 11 wherein said linkage means comprises a pivotal lever arm having a yoke at one end thereof for engaging said lens mounting means and including a yieldable spring connecting the other end of said lever arm to said actuator.

13. A photographic camera having a film plane comprising:
   a lens;
   means for mounting said lens for displacement between a first position in which subjects located in one distance range from the camera are focused on the film plane, and a second position in which subjects located in another distance range from the camera are focused on the film plane;
   an actuator; and
   means for initially locating said lens in its said first position and energizable responsive to the manual actuation of said actuator for detecting the location of a subject to be photographed in said other distance range and for effecting displacement of said lens mounting means to move said lens from its said first position into its said second position at such times that a subject is so detected.

14. The invention of claim 13 wherein said actuator is mounted for displacement between a first position and a second position and said last-stated means includes a lever arm having a first end connected to said lens mounting means and a second end, said lever arm being pivotally mounted intermediate its said first and second ends, a spring connected between said second end of said lever arm and said actuator, said last-mentioned means being arranged such that said spring urges said lever arm in a first direction about its pivot mount when said actuator is disposed in its said first position and in a direction opposite said first direction about its pivot mount when said actuator is disposed in its said second position.

15. The invention of claim 14 wherein said spring acts to urge said lens towards its said second position when said actuator is disposed in its said second position, and wherein said last-mentioned means additionally includes a normally deenergized electromagnet disposed in operative relationship with said lever arm when said actuator is disposed in its said first position and means responsive to the manual displacement of said actuator towards its said second position to energize said electromagnet thereby retaining said lens in its said first position against the forces exerted through said lever arm thereon by said spring when said actuator is in its said second position, said last-mentioned means additionally including means for deenergizing said electromagnet responsive to said detecting means detecting a subject in said other distance range thereby permitting said spring to effect the movement of said lens into its said second position when said actuator is in its said second position at such times.

* * * * *